US006756937B1

(12) United States Patent
Chang et al.

(10) Patent No.: US 6,756,937 B1
(45) Date of Patent: Jun. 29, 2004

(54) STRATOSPHERIC PLATFORMS BASED MOBILE COMMUNICATIONS ARCHITECTURE

(75) Inventors: Donald C. D. Chang, Thousand Oaks, CA (US); Ming U. Chang, Rancho Palos Verdes, CA (US); Ying Feria, Manhattan Beach, CA (US); Weizheng Wang, Rancho Palos Verdes, CA (US); Alan Cha, Glendale, CA (US); Kar W. Yung, Torrance, CA (US); Frank A. Hagen, Palos Verdes Estates, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 8 days.

(21) Appl. No.: 09/588,395

(22) Filed: Jun. 6, 2000

(51) Int. Cl.[7] .............................................. H04B 7/185
(52) U.S. Cl. ..................................... 342/354; 455/13.3
(58) Field of Search ........................ 342/354; 455/13.3, 455/429, 431

(56) References Cited

U.S. PATENT DOCUMENTS

| 2,470,787 A | | 5/1949 | Nosker ........................ 342/12 |
| 3,541,553 A | * | 11/1970 | Gubin ........................ 342/353 |
| 3,720,953 A | | 3/1973 | Ajioka ........................ 343/771 |
| 4,161,730 A | | 7/1979 | Anderson |
| 4,161,734 A | | 7/1979 | Anderson ................... 343/100 |
| 4,359,733 A | | 11/1982 | O'Neill ...................... 343/6.5 |
| 4,613,864 A | | 9/1986 | Hofgen ....................... 343/357 |
| 4,635,063 A | | 1/1987 | Chang et al. ............... 342/380 |

(List continued on next page.)

FOREIGN PATENT DOCUMENTS

| EP | 0335 558 | 4/1989 |
| EP | 0776 099 A2 | 5/1997 |

(List continued on next page.)

OTHER PUBLICATIONS

Djuknic, Goran et al, "Establishing Wireless Communications Services via High–Altitude Aeronatuical Platforms: A Concept Whose Time Has Come?" IEEE Communications Magazine, Sep. 1997, pp. 128–135.*

(List continued on next page.)

*Primary Examiner*—Gregory C. Issing
(74) *Attorney, Agent, or Firm*—Georgann S. Grunebach; John A. Crook, III

(57) ABSTRACT

A communication system including a first transceiver located on a first platform at a predetermined altitude. A first antenna is located on the first platform and connected to the first transceiver. A second antenna is connected to the other end of the first transceiver. A second transceiver is located on a ground hub physically and independent of the first platform. A third antenna is located on the ground hub and connected to the second transceiver. The third antenna is adapted to communicate with the second antenna. The first platform is maintained in a stratospheric orbit. A beamforming system is connected to the second transceiver and mounted on the ground hub. The beamforming system provides a beamformed signal from the second transceiver to the first transceiver effective to drive the first array antenna to radiate multiple beams to a surface, whereby the multiple beams create time varying and dissimilar footprints thereon. A second antenna is mounted on the first platform to receive the beamformed signal from the ground hub. The beamforming system is adapted to drive the first antenna to generate plural beams on the earth's surface, each beam providing a respective footprint or cell. Each beam tracks a respective user located at a center of each cell. The system allows for narrow beams to be created which, in turn, enables frequency reuse. A code is assigned to each beam and a mechanism is provided for preventing a user from receiving more than one beam with a given code. This mechanism is adapted to anticipate a condition by which a user will move to a location at which the user would receive more than one beam with a given code. The mechanism will quickly assign a second code to at least one beam prior to the arrival of the user at that position.

58 Claims, 6 Drawing Sheets

U.S. PATENT DOCUMENTS

| | | | |
|---|---|---|---|
| 4,799,065 A | 1/1989 | Thompson | |
| 4,823,341 A | 4/1989 | Rosen | |
| 4,979,170 A | 12/1990 | Gilhousen et al. | 370/104.1 |
| 4,994,809 A | 2/1991 | Yung et al. | 342/108 |
| 5,006,855 A | 4/1991 | Braff | 342/357 |
| 5,017,927 A | 5/1991 | Agrawal et al. | 342/371 |
| 5,077,562 A | 12/1991 | Chang et al. | 342/368 |
| 5,081,464 A | 1/1992 | Renshaw | |
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,151,706 A | 9/1992 | Roederer et al. | |
| 5,218,619 A | 6/1993 | Dent | 375/1 |
| 5,327,455 A | 7/1994 | De Gaudenzi et al. | |
| 5,387,916 A | 2/1995 | Cohn | 342/44 |
| 5,408,237 A | 4/1995 | Patterson et al. | 342/354 |
| 5,410,314 A | 4/1995 | Frush et al. | 342/26 |
| 5,444,450 A | 8/1995 | Olds et al. | 342/357 |
| 5,475,520 A | 12/1995 | Wissinger | |
| 5,525,995 A | 6/1996 | Benner | 342/90 |
| 5,550,809 A | 8/1996 | Bottomley et al. | 370/18 |
| 5,555,257 A | 9/1996 | Dent | 370/95.1 |
| 5,589,834 A * | 12/1996 | Weinberg et al. | 342/354 |
| 5,594,941 A | 1/1997 | Dent | 455/13.4 |
| 5,732,351 A | 3/1998 | Olds et al. | 455/436 |
| 5,739,785 A | 4/1998 | Allison et al. | 342/357 |
| 5,754,139 A | 5/1998 | Turcotte et al. | |
| 5,764,188 A | 6/1998 | Ghosh et al. | |
| 5,839,053 A | 11/1998 | Bosch et al. | |
| 5,867,109 A | 2/1999 | Wiedeman | |
| 5,878,034 A | 3/1999 | Hershey et al. | |
| 5,890,067 A | 3/1999 | Chang et al. | 455/446 |
| 5,907,816 A | 5/1999 | Newman et al. | |
| 5,909,460 A | 6/1999 | Dent | 375/200 |
| 5,917,447 A | 6/1999 | Wang et al. | 342/383 |
| 5,918,157 A | 6/1999 | Wiedeman et al. | |
| 5,920,284 A | 7/1999 | Victor | 342/357.01 |
| 5,944,770 A | 8/1999 | Enge et al. | 701/707 |
| 5,945,948 A | 8/1999 | Buford et al. | 342/457 |
| 5,946,625 A | 8/1999 | Hassan et al. | |
| 5,956,619 A | 9/1999 | Gallagher et al. | |
| 5,966,371 A | 10/1999 | Sherman | |
| 5,973,647 A | 10/1999 | Barrett et al. | 343/713 |
| 5,974,039 A | 10/1999 | Schilling | |
| 5,974,317 A | 10/1999 | Djuknic et al. | 455/431 |
| 5,974,324 A | 10/1999 | Henson | |
| 5,982,337 A * | 11/1999 | Newman et al. | 343/816 |
| 6,002,935 A | 12/1999 | Wang | 455/447 |
| 6,016,124 A * | 1/2000 | Lo et al. | 342/373 |
| 6,018,316 A | 1/2000 | Rudish et al. | |
| 6,020,845 A | 2/2000 | Weinberg et al. | 342/354 |
| 6,023,463 A | 2/2000 | Wiedeman et al. | |
| 6,032,041 A | 2/2000 | Wainfan et al. | |
| 6,047,186 A | 4/2000 | Yu et al. | 455/446 |
| 6,061,562 A | 5/2000 | Martin et al. | |
| 6,088,341 A | 7/2000 | Hinedi et al. | |
| 6,104,911 A | 8/2000 | Diekelman | |
| 6,147,658 A | 11/2000 | Higashi et al. | 343/853 |
| 6,150,977 A | 11/2000 | Wilcoxson et al. | |
| 6,157,621 A | 12/2000 | Brown et al. | |
| 6,167,263 A | 12/2000 | Campbell | |
| 6,169,910 B1 | 1/2001 | Tamil et al. | 455/562 |
| 6,173,178 B1 * | 1/2001 | Hammill et al. | 455/12.1 |
| 6,176,451 B1 | 1/2001 | Drymon | |
| 6,195,037 B1 | 2/2001 | Gross et al. | 342/354 |
| 6,195,555 B1 | 2/2001 | Dent | |
| 6,201,797 B1 | 3/2001 | Leuca et al. | |
| 6,205,320 B1 | 3/2001 | Coleman | |
| 6,240,072 B1 | 5/2001 | Lo et al. | |
| 6,272,317 B1 | 8/2001 | Houston et al. | |
| 6,295,440 B2 | 9/2001 | Chang et al. | 455/13.1 |
| 6,308,045 B1 | 10/2001 | Wright et al. | |
| 6,311,068 B1 | 10/2001 | Leung et al. | 455/447 |
| 6,317,412 B1 | 11/2001 | Natali et al. | |
| 6,324,398 B1 | 11/2001 | Lanzerotti et al. | |
| 6,336,030 B2 | 1/2002 | Houston et al. | 455/13.2 |
| 6,337,980 B1 | 1/2002 | Chang et al. | 455/430 |
| 6,339,611 B1 | 1/2002 | Antonio et al. | |
| 6,339,708 B1 | 1/2002 | Wang | 455/447 |
| 6,366,256 B1 | 4/2002 | Ramanujam et al. | |
| 6,374,080 B2 | 4/2002 | Uchida | |
| 6,380,893 B1 | 4/2002 | Chang et al. | |
| 6,388,615 B1 | 5/2002 | Chang et al. | 342/368 |
| 6,408,180 B1 | 6/2002 | McKenna et al. | |
| 6,414,646 B2 | 7/2002 | Luh | |
| 6,434,384 B1 | 8/2002 | Norin et al. | |
| 6,438,379 B1 | 8/2002 | Gitlin et al. | |
| 6,456,846 B2 | 9/2002 | Norin et al. | |
| 6,463,282 B2 | 10/2002 | Norin et al. | 455/429 |
| 6,480,788 B2 | 11/2002 | Kilfeather et al. | |
| 6,507,314 B2 | 1/2003 | Chang et al. | |
| 6,507,739 B1 | 1/2003 | Gross et al. | |
| 6,513,758 B1 | 2/2003 | Lloyd | |
| 6,570,858 B1 | 5/2003 | Emmons, Jr. et al. | |
| 2001/0000167 A1 | 4/2001 | Chang et al. | 455/13.1 |
| 2002/0006795 A1 * | 8/2001 | Norin et al. | 455/429 |
| 2001/0048389 A1 | 12/2001 | Nakagawa | |
| 2002/0041575 A1 | 4/2002 | Karabinis et al. | |
| 2002/0072361 A1 | 6/2002 | Knoblach et al. | |
| 2002/0080732 A1 | 6/2002 | Feria et al. | 370/320 |
| 2002/0081969 A1 | 6/2002 | Chang et al. | |
| 2002/0107034 A1 | 8/2002 | Chang et al. | |
| 2002/0126042 A1 | 9/2002 | Chang et al. | 342/354 |
| 2002/0128045 A1 | 9/2002 | Chang et al. | |
| 2002/0168991 A1 | 11/2002 | Kochanski et al. | |

FOREIGN PATENT DOCUMENTS

| | | | |
|---|---|---|---|
| EP | 0 837 568 A2 | 4/1998 | |
| EP | 0 845 874 A2 | 6/1998 | |
| EP | 0 860 710 A2 | 8/1998 | |
| EP | 0860 952 A2 | 8/1998 | |
| EP | 1 037 403 A2 | 9/2000 | |
| EP | 1 139 583 A2 | 10/2001 | |
| EP | 1 148 662 A2 | 10/2001 | |
| EP | 1 158 698 A2 | 11/2001 | |
| EP | 1 161 001 A2 | 12/2001 | |
| GB | 2271 902 A | 10/1993 | |
| GB | 2306 827 A | 5/1997 | |
| JP | 3-291584 | 12/1991 | |
| JP | 07146995 A | 6/1995 | |
| JP | 08015405 A | 1/1996 | |
| JP | 09026328 | 1/1997 | |
| JP | 09113600 A | 5/1997 | |
| JP | 10090391 A | 4/1998 | |
| JP | 4-27887 | 7/2000 | |
| JP | 2-28580 | 8/2000 | |
| WO | WO 96/22661 | 7/1996 | |
| WO | WO 97/07609 A2 * | 2/1997 | |
| WO | WO 97/07609 | 2/1997 | |
| WO | WO 9851568 A | 11/1998 | |
| WO | WO 99/13598 | 3/1999 | |
| WO | WO 99/23769 | 5/1999 | |
| WO | WO 00/14902 A2 * | 3/2000 | H04B/7/185 |
| WO | WO 01/95520 A2 | 12/2001 | |

OTHER PUBLICATIONS

Colella, Nicholas, "HALO Network—The Birth of Stratospheric Communications Services & The Decline of Satellite Networks" HTTP://www.angelhalo.com/techpaper6, Copyright 1997–1999.*

Martin, James N. et al, "HALO Network—The Cone of Commerce", HTTP//www.angelhalo.com/techpaper2, Copyright 1997–1998.*

Martin, James N. et al, "HALO Network—Broadband Wireless Services from High Altitude Long Operation (HALO) Aircraft", HTTP://www.angelhalo.com/techpaper1, Copyright 1997–1998.*

Akyildiz, Ian F. et al, "HALO (High Altitude Long Operation): A Broadband Wireless Metropolitan Area Network," IEEE International Workshop on Mobile Multimedia Communications, Nov. 1999, pp. 271–275.*

Colella, Nicholas J. et al., "The HALO Network™", IEEE Communciations Magazine, Jun. 2000, pp. 142–148.

Colella, Nicholas J. et al., "High Speed Internet Access via Stratospheric HALO Aircraft", INET 99 Proceedings, Internet Society, Technology, Wireless, 13 pages, Jun. 8, 1999.

Casewell I.E. , "The provision of GSM cellular radio environments within passenger aircraft operating over Europe", Racal Res. Ltd., Walton–on–Thames, Mobile Radio and Personal Communications, 1989, Fifth International Conference, Dec. 11, 1989–Dec. 14, 1989, pp. 172–176.

U.S. patent application Ser. No. 09/611,753, Chang et al., filed Jul. 7, 2000.

Teles J. et al, "Overview of TDRSS" Orbit Determination and Analysis, PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.

Bricker, P. et al, "Integrated Receiver for NASA Tracking and Data Relay Satellite System", MILCOM 90, A New Era, 1990 IEEE Military Communications Conference, Monterey, CA USA, Sep. 30–Oct. 3, 1990, pp. 1–5.

Dunham, J. B. et al, "Onboard Orbit Estimation with Tracking and Data Relay Satellite System Data", Journal of Guidance, Control and Dynamics, Jul.–Aug. 1983, USA, col. 6 NR.4, pp. 292–301.

Bethke,K.H., A Novel Noncooperative Near–Range Radar Network For Traffic Guidance and Control on Airport Surfaces, IEEE Transactions on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

Suzuki, R. et al, :Mobile TDM/TDMA System With Active Array Antenna, Global Telecommunications Conference, 1991; Globecom '91, vol. 3, Dec. 2–5, 1991, pp. 1569–1573.

Chan, K. K., et al, "A Circularly Polarized Waveguide Array for Leo Satellite Communications", Antennas and Propagation Society, 1999, IEEE International Symposium, vol. 1, Jul. 11–16, 1999, pp. 154–157.

Oodo, M., et al, "Onboard DBF Antenna for Stratospheric Platform", 2000 IEEE International Conference on Phased Array Systems and Technology, Proceedings, May 21–25, 2000, pp. 125–128.

Yokosuka Research Park, "The First Stratospheric Platform Systems Workshop", May 12–13, 1999, pp. 1–216.

Chiba, Isamu et al, "Digital Beam Forming (DBF) Antenna System for Mobile Communications", IEEE AES Systems Magazine, Sep. 1997, pp. 31–41.

Miura, Ryu et al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

Sakakibara, Kunio et al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

* cited by examiner

STRATOSPHERIC PLATFORMS BASED MOBILE COMMUNICATIONS ARCHITECTURE

BACKGROUND OF THE INVENTION

1. Field of the Invention

The present invention relates to communications systems. More specifically, the present invention relates to architectures for multimedia including data/voice services to mobile users using stratospheric platforms.

2. Description of the Related Art

Stratospheric platforms are being considered for multimedia including data/voice communication applications. Current proposals envision a mounting of transceivers and antennas on aircraft flying at 20–30 kilometers above the earth which will project beams to cell sites located on the ground.

Conventionally, cells projected on the ground are uniform in size. If the user distribution is uniform, the equal sized cell structure is optimal. However, equal cell size comes at some cost in hardware. To avoid mechanical tracking systems on the antennas, which can be costly and unreliable, the antennas are typically implemented as phased arrays of radiating elements and steered electronically. At the altitude above the ground, where the payload carrying platform is located, a same-sized ground projection of cells requires smaller angular beams as the scan angle increases. To form smaller beams, more antenna array elements are needed. For a light-weight payload, the number of elements may be limited, thus forming smaller beams at the edge of the coverage may be costly.

Further, prior stratospheric based platform proposals envision a fixed cell structure by which the beams stare at all cells in the entire coverage area, similar to a cellular system. If resources are available, this approach is viable. In some systems, however, resources may be limited. For such systems, use of a fixed cell structure limits the coverage area. Consequently, total system capacity is reduced. That is, at any given time, the entire coverage area may not be covered by beams that provide adequate link margin for billable data transmissions.

Hence, there is a need in the art for a stratospheric platform based communication system offering maximum throughput with the constraints of weight, power and spectrum. More specifically, there is a need in the art for a stratospheric platform based communication system and method for projecting beams of varying cell structure in both time and space to maximize system capacity within the weight, power and bandwidth constraints thereof and thereby to optimize the communications capacity for billable voice and data transmissions.

SUMMARY OF THE INVENTION

The need in the art is addressed by the communication system of the present invention. The inventive communication system includes a first transceiver located on a first platform at a predetermined altitude. A first antenna (array) at, say, S-band is located on the first platform and connected to the first transceiver. A second (high gain) antenna at, say, X or C-band is connected to the other end of the first transceiver. A second transceiver is located on a ground hub physically and is independent of the first platform. A third antenna at, say, X or C-band, is located on the ground hub and connected to the second transceiver. The third antenna is adapted to communicate with the first platform via a second (high gain) antenna at X or C-band on the first platform. A beamforming system is connected to the second transceiver and mounted on the ground hub. The beamforming system provides beamformed signals from the second transceiver to the first transceiver effective to drive the first antenna array to radiate multiple beams to a surface, whereby the multiple beams create time varying and dissimilar footprints thereon.

In the illustrative embodiment, the first platform is maintained in a stratospheric orbit, the second transponder is located on the ground hub. A second (high gain) antenna is mounted on the first platform to receive the beamformed signal from the ground hub in the forward link direction. The beamforming system on ground is adapted to drive the first array antenna on the first platform to generate plural beams on the earth's surface, each beam providing a respective footprint or cell. Similarly, the multiple user signals, arrived at the first antenna array in the return link direction, will be amplified, filtered, frequency translated, code multiplexed, amplified again, and then radiated through the second (high gain) antenna to the ground hub. The third antenna on the ground hub will receive the multiplexed element signals, which will then be amplified, filtered, down-converted, and demodulated to recover individual clement level signals before digitization. The digitized element level signals will be pushed through the digital beam forming network, which separates user signals via their angle of arrivals (with respect to the first array antenna on the platform).

Each beam tracks a respective user located at a center of each cell. The system allows for narrow beams to be created which, in turn, enables frequency reuse. A code is assigned to each beam and a mechanism is provided for preventing a user from receiving more than one beam with a given code. This mechanism is adapted to anticipate a condition by which a user may move to a location at which the user would receive more than one beam with a given code. It will assign a second code to at least one beam prior to the arrival of the user at that position.

The present invention allows the cell size to be non-uniform. That is, near center of coverage, or nadir, the cell can be smaller. As the scan angle increases, the cell sizes increase. Cell size equalization may require additional apertures or much more array elements. It will drive the payload weight and cost significantly. The invention allows for a light-weight payload design and full utilization of the resources that a light-weight payload can offer.

The present invention forms beams where there are users present with beams of shapes and sizes that are not necessarily uniform in space and constant in time. One or more broad beams may be formed to provide links supporting lower data rates. These lower data rate links are used to support acquisition protocol for new users trying to get on the system. This allows the coverage area to be greater with limited receiving beams. In addition, by allowing the beam size to be smaller near the center of coverage (nadir of the platform), the code or frequency reuse distance can be reduced, therefore enhancing the total system capacity.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
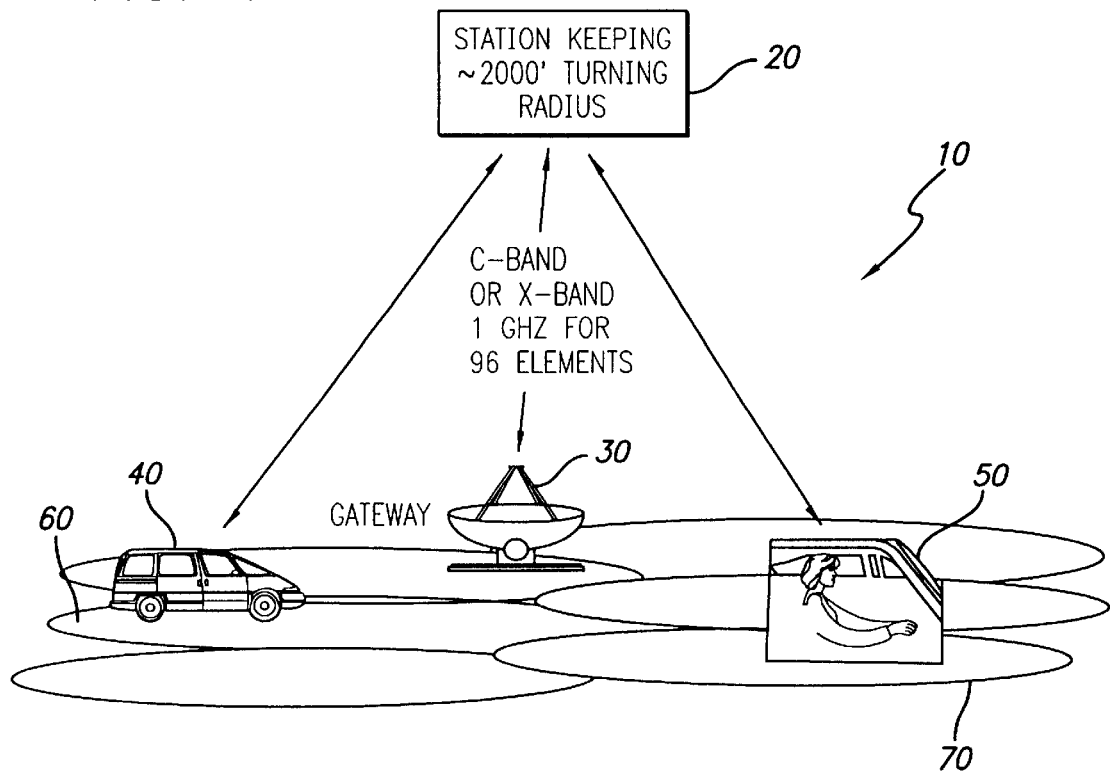
FIG. 1 is a diagram illustrative of the stratospheric communication system of the present invention with a single stratospheric platform.

FIG. 1 is a diagram illustrative of the stratospheric communication system of the present invention with a single stratospheric platform. The inventive system 10 includes a transceiver system 20 mounted on an airborne platform (not shown). In practice, the platform could be an airplane flying in a small tight circle (an orbit) at 20–30 kilometers (km) above the ground. Those skilled in the art will appreciate that this altitude is 2 to 3 times that of commercial aircraft (i.e., 10 km) and much lower than the altitude of a low earth orbit satellite (1000 km). The transceiver 20 is adapted to communicate with a hub 30 and a plurality of users 40 and 50 located on cells 60 and 70, respectively, on the earth's surface.

Figure 2:
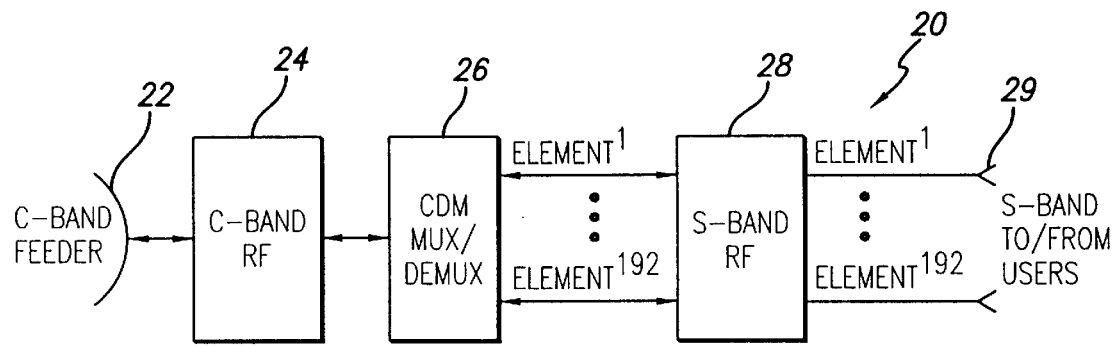
FIG. 2 is a simplified block diagram of the airborne platform based transceiver system implemented in accordance with the present teachings.

FIG. 2 is a simplified block diagram of the airborne platform based transceiver system implemented in accordance with the present teachings. The system 20 includes a feeder link antenna 22 adapted to receive signals from the hub system 30 and to transmit signals to the ground hub. The feeder link antenna can be at C, X or other suitable frequency band. The antenna 22 is connected to a bi-directional radio frequency (RF) electronics 24. In the forward link direction, it will provide amplification and frequency down-conversion functions. The RF electronics 24 outputs a signal at S-band which is demultiplexed by a code division demultiplexer 26 into plural separate signals of which 192 are shown in the figure. Each corresponds to an aggregated multi-user signals ready for an individual antenna array element. The multiplexer/de-multiplexer 26 is bi-directional and serves to multiplex plural signals from various receiving elements of the array antenna into a single signal when the system 20 is operating as a receiver in the return link direction. Those skilled in the art will appreciate that the system shown in FIG. 2 is intended for illustration only. Accordingly, the present teachings are not limited to the number of channels or elements shown. Nor is the system limited to the specific circuit configuration shown. Other circuit configurations may be used without departing from the scope of the present teachings.

The demultiplexed signals feed RF up-converters and SSPA's 28. In the illustrative embodiment, the RF electronics 28 operates at S-band. The upconverters and SSPA's drive the array antenna 29 elements. The element phasing are accomplished by the digital-beam-forming network 38 in the ground hub 30 and are imbedded in the signals themselves. As discussed more fully below, the array antenna 29 transmits and receives multiple output beams. Each beam creates a footprint on the surface that provides a cell such as the cells shown at 60 and 70 in FIG. 1.

As discussed more fully below, the present invention allows the cell size to be non-uniform. That is, near center of coverage, or nadir, the cell will be smaller. As the scan angle increases, the cell sizes increase. There is no need for cell size equalization. As a result, this invention allows for a very light weight payload design and full utilization of the resources that a light-weight payload can offer. The present invention forms beams where there are users present with beams of shapes and sizes that are not necessarily uniform. In addition, by allowing the beam size to be smaller near the center of coverage (nadir of the platform), the code or frequency reuse distance can be reduced, therefore enhancing the total system capacity. One or more broad beams are formed to provide links supporting lower data rates. These lower data rate links with broad beam width are used for the acquisition processes of new users trying to get on the system.

Figure 3:
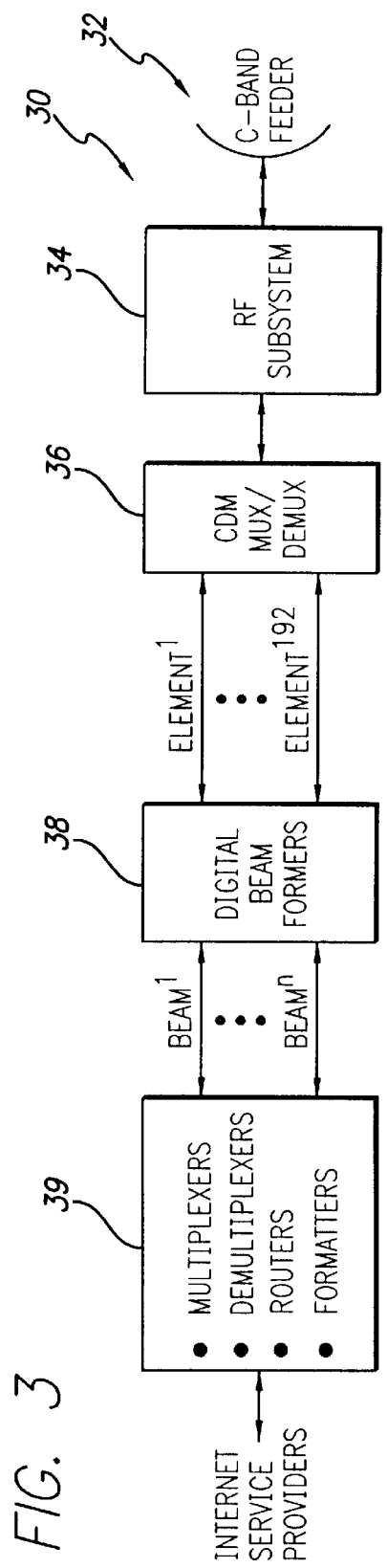
FIG. 3 is a simplified block diagram of a ground hub in accordance with the teachings of the present invention.

FIG. 3 is a simplified block diagram of a hub in accordance with the teachings of the present invention. The hub transceiver system 30 includes an X or C-band antenna 32 adapted to communicate with the other X or C-band antenna 22 on the airborne platform. The ground antenna 32 connects to an RF subsystem 34 which provides amplification, filtering, upconversion and down-conversion functions in a conventional manner. In the return link direction, the subsystem 34 outputs a multiplexed signals which will be pushed through a code demultiplexer 36 to recover signals at array element level prier to a digital beam former 38, which will separate user signals via spatial discrimination techniques. The outputs are the individual signals, which will be further processed by multiplexers/demultiplexers, routers, and/or formatters 39. This post-processor in the return link direction is connected to an external network such as the Internet or World Wide Web.

The systems depicted in FIGS. 2 and 3 may be implemented in accordance with the teachings of U.S. Pat. No. 5,903,549, issued May 11, 1999 to Von Der Embse and entitled Ground Based Beam Forming Utilizing Synchronized CDMA, the teachings of which are hereby incorporated by reference herein. The number of beams (or simultaneous users) 'n' is scaleable at the gateway.

In the forward link direction, all the functions will be reversed. The post-processor will become a pre-processor.

The DBF will convert multiple user signals to an equivalent set of array element level signals. Each represent an aggregation of phase weighted signals from all the users. The element phasing information for the array antenna 29 is imbedded in the aggregated signals themselves in the DBF 38 through the combinations by which user signals are phase weighted. The X or C-band antenna 32 will transmit a multiplexed signals at array element level to the platform.

In accordance with the present teachings, the beam forming circuit 38 generates phasings, weightings and codes for each of a plurality of beams. These beams are multiplexed into a single stream which is transmitted up to the airborne platform 20 via the link provided by the feeders 22 and 32 of FIGS. 2 and 3 respectively. When the stream is received on the airborne platform, it is demultiplexed into separate elements for the array antenna 29. The phasing and weighting of the signals provided by the beamforming circuit 38 is effective to generate the plural beams and steer each one to a desired direction. In the preferred embodiment, each beam is assigned to a user or a zone. If assigned to a user, the beam is adapted to move with the user to minimize the number of code handovers and to increase antenna directivity in user links. Static beams are formed where no user tracking beams are present for new user detection.

Conventionally, the beams radiated by the array antenna 29 of FIG. 2, would be constrained to provided fixed, uniform footprints or cells on the ground. If the user distribution is uniform, the equal sized cell structure is optimal. However, equal cell size comes at some cost in hardware. At a certain altitude from the ground, where a payload carrying platform locates, a same-sized ground projection cells require smaller angular beams as the scan angle increases. To form smaller beams, more antenna array elements or separated additional apertures will be needed. As a result, the payload may weigh more and consume more power. For a platform capable of carrying limited payload, forming smaller beams at the edge of the coverage may be costly and not practical.

To avoid the need for a mechanical tracking system on the antennas, which can be costly and unreliable, an array antenna with about 100 to 200 radiating elements is selected as the primary aperture on the platform. The radiators and the amplifiers are on board but the beam steering mechanism is implemented on ground via a digital beam forming network. However, in accordance with the present teachings, the beams are formed without regard to a fixed uniform pattern by the digital beam forming network 38 on the ground hub. The system 10 is designed to cover a service area with as many users as possible. If the cell size is uniform on the ground, then the required number of elements in the phased array antenna would be so high that a light-weight payload would not be possible. On the other hand, some elements are not being utilized to form wider beams at the center of the coverage (or nadir of the platform), the resource (frequency or code) reuse distance would be longer. This would result in fewer users on the system and lower total system capacity.

Consequently, the system 10 of the present invention is designed with a dynamic cell structure utilizing all the resources available on a light-weight payload to form beams as small as possible and reuse the frequency or CDMA code as often as possible to enhance the total system capacity. That is, the system 10 allows the cell sizes to be nonuniform. At center of coverage, or nadir, the cell will be smaller. As the scan angle increases, so does the cell size. In addition, the cell shape is not restricted to be perfectly circular. The cell shape may be elongated as the scan angle increases. This is depicted in FIG. 4 below.

Figure 4:
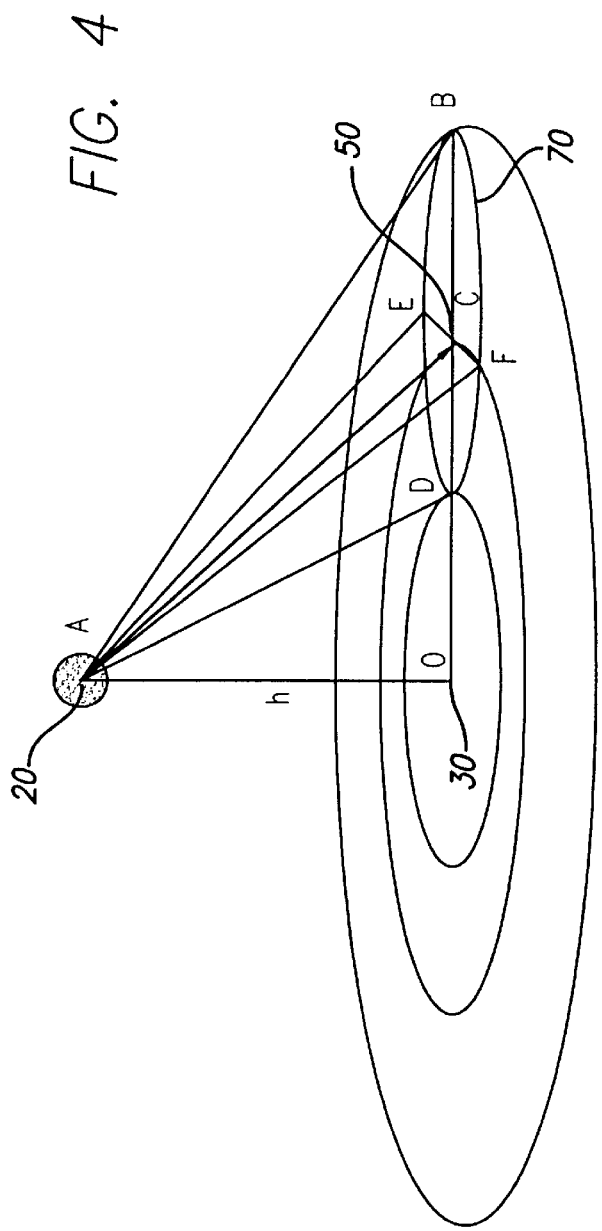
FIG. 4 is a diagram which shows how nonuniform cells are created with a fixed platform antenna aperture.

FIG. 4 is a diagram which shows how nonuniform cells are created with a fixed platform antenna aperture. The scenario illustrated in this figure assumes a nominally circular antenna array situated at 'A' and oriented normal to the local vertical. The antenna is at an altitude 'h' above the ground point 'O', which is at the center of the coverage area. Now consider the beam formed by this antenna having maximum directivity in the direction of a user located at point 'C'. Assuming that differential spreading of the antenna gain across the beam width can be neglected, the contour of constant antenna gain on the ground plane, denoted 'BDEF'0 in the figure, will be elliptical in form. Furthermore, the long-side spreading ($\angle$CAD and $\angle$CAB) will be equal, as will the short-side spreading angles ($\angle$CAE and $\angle$CAF). The distances CB, CD, CE, and CF can be easily calculated as $$\frac{CB}{h} = \tan\left(\angle OAC + \left[\begin{array}{c}\text{long-side}\\\text{spreading-angle}\end{array}\right]\right) - \tan(\angle OAC)$$

$$\frac{CD}{h} = \tan(\angle OAC) - \tan\left(\angle OAC - \left[\begin{array}{c}\text{long}-\text{side}\\\text{spreading}-\text{angle}\end{array}\right]\right)$$

$$\frac{CE}{h} = \frac{CF}{h} = \frac{1}{\cos(\angle OAC)}\tan\left(\left[\begin{array}{c}\text{short}-\text{side}\\\text{spreading}-\text{angle}\end{array}\right]\right)$$

Assuming the antenna aperture is constant, the spreading angles are then a function of the distance between a user and the projected platform location on the ground (OC). The larger the distance OC is, the larger the spreading angles are, as shown in FIG. 5.

Figure 5:
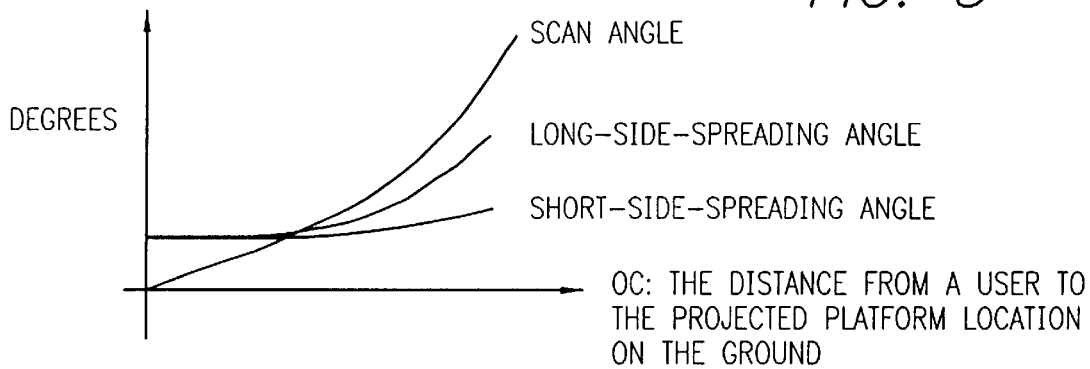
FIG. 5 is a set of graphs showing spreading angle as a function of distance from the projected platform nadir location to a user.

FIG. 5 is a set of graphs showing spreading angle as a function of distance from the projected platform location to a user of an elevated beam projection system. Note that the short-side spreading angle may be different from the long-side spreading angle.

In practice, optimal utilization of system resources calls for multiple (e.g. 200) beams to be generated. As mentioned above, in the preferred embodiment, each beam would track a user if a user were present. To maximize system capacity, the frequencies are reused by assigning codes to each beam.

In the illustrative implementation, a group of 64 codes is divided into 4 subgroups. Each subgroup of codes is referred to as one color of codes and has 16 individual codes. In the illustrative embodiment, there are four colors of codes. The assignment of one color of codes is independent of the other colors of codes. The same color of codes can be reused outside a criterion. In the illustrative embodiment, a 20 decibel (dB) sidelobe contour criterion is employed. Every user will have a surrounding exclusion region bounded by the −20 dB contour. In accordance with this criterion, a beam collision will be detected when the user moves into the exclusion zone of another user and receives an interference signal from the second user therein at a level of 20 dB down from maximum or higher. The 20 dB sidelobe contours can be of different sizes and shapes throughout a coverage area.

Figure 6:
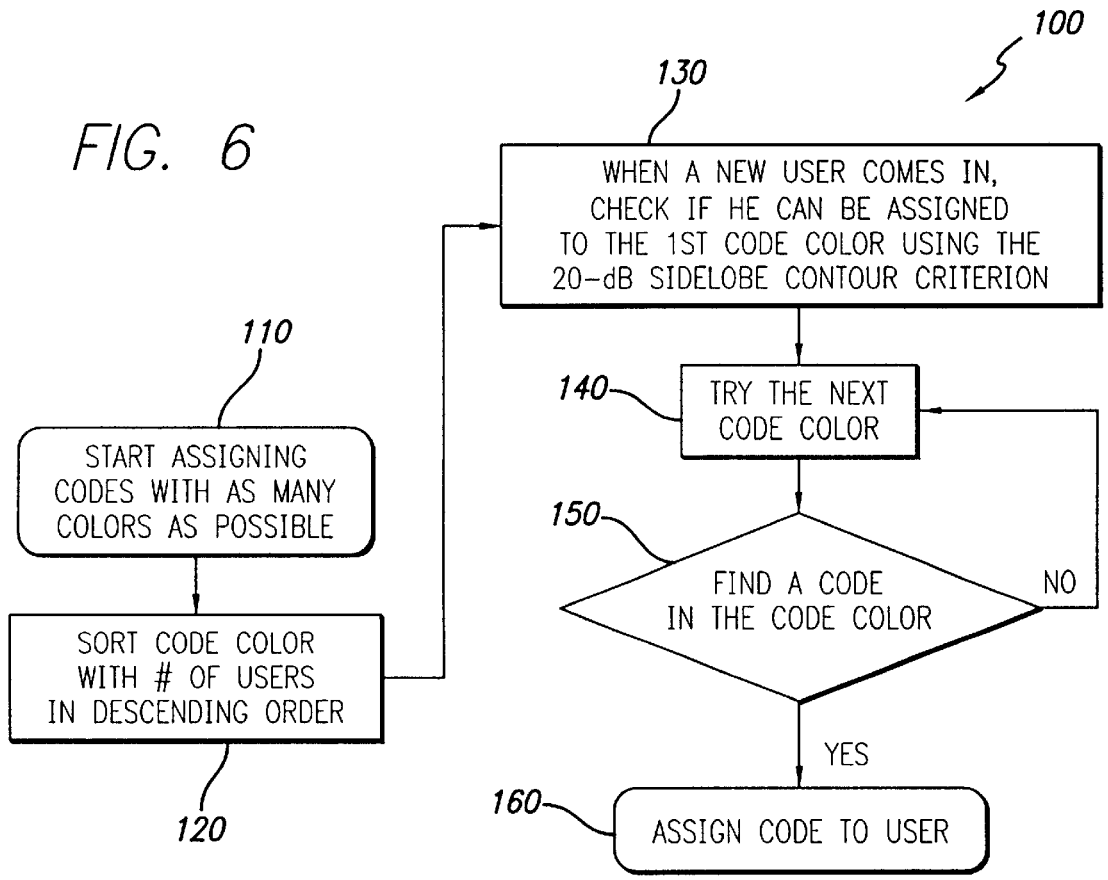
FIG. 6 is a block diagram of an illustrative implementation of a code assignment algorithm for use in connection with the communication system depicted in FIG. 1.
Figure 7:
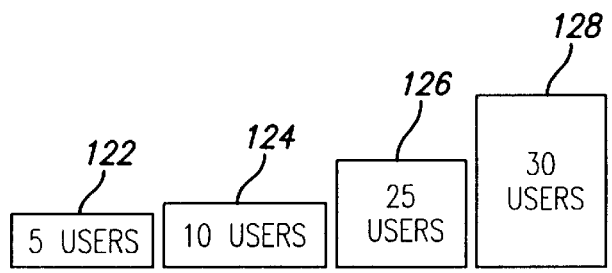
FIG. 7 is a diagram that illustrates color code assignments based on the number of users in accordance with the method of the present invention.

FIG. 6 is a block diagram of an illustrative implementation of a code assignment algorithm as a part of resource management for use in connection with the communication system depicted in FIG. 1. FIG. 7 is a diagram that illustrates color code assignments based on the number of users in accordance with the method of the present invention. The method 100 includes the step of assigning codes with as many colors as possible (110). Next, the code colors are sorted with the number of users in descending order (step 120). Hence, as shown in FIG. 7, purple 122 might be used for 5 users, orange 124 might be used for 10 users, pink 126 might be used for 25 users and blue 128 might be used for 30 users.

Returning to FIG. 6, at step 130, if a new user enters a cell, the system checks to determine if the new user can be assigned to the first code color using the 20 dB sidelobe contour criterion. If not, at step 140, the system 10 tries the next color. At step 150, the system endeavors to find a code in the code color and at step 160, the code is assigned to the user.

Illustrative code assignments are shown in FIGS. 8–13.

Figure 8:
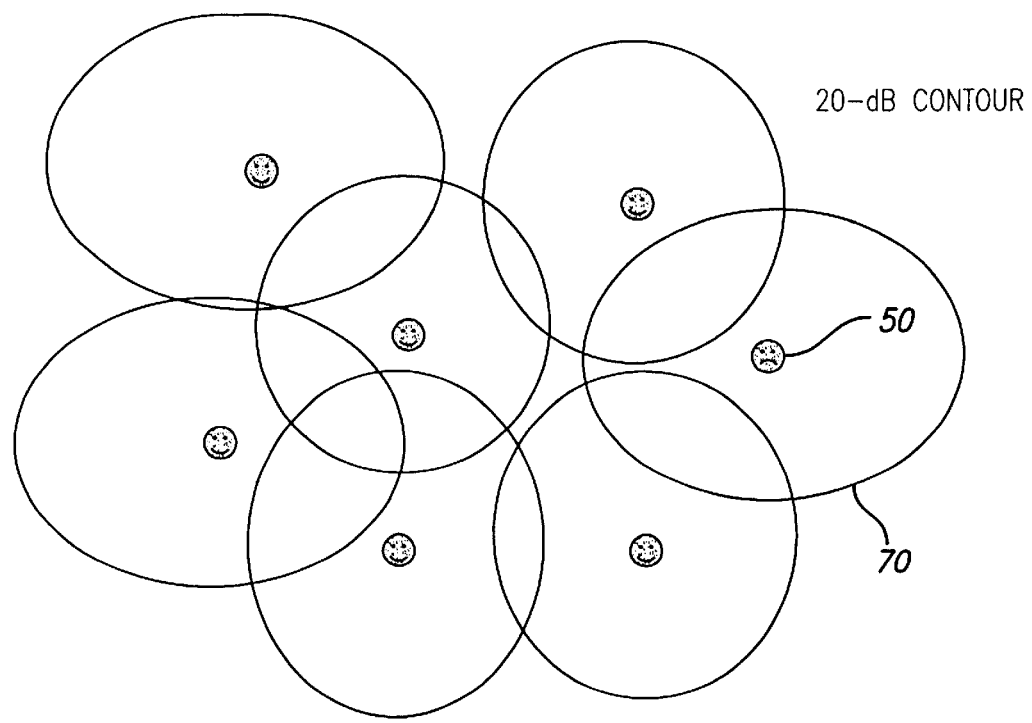
FIG. 8 shows a color 1 code assignment (blue) in accordance with the teachings of the present invention.

FIG. 8 shows a color 1 code assignment (blue) in accordance with the teachings of the present invention.

Figure 9:
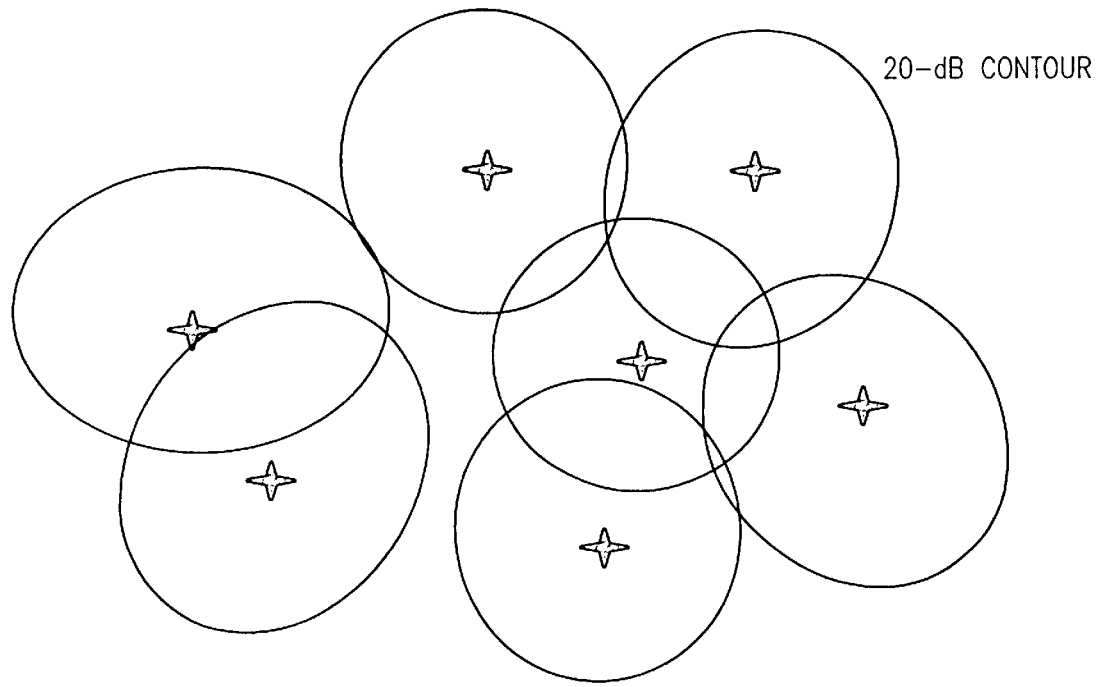
FIG. 9 shows a color 2 code assignment (pink) in accordance with the teachings of the present invention.

FIG. 9 shows a color 2 code assignment (pink) in accordance with the teachings of the present invention.

Figure 10:
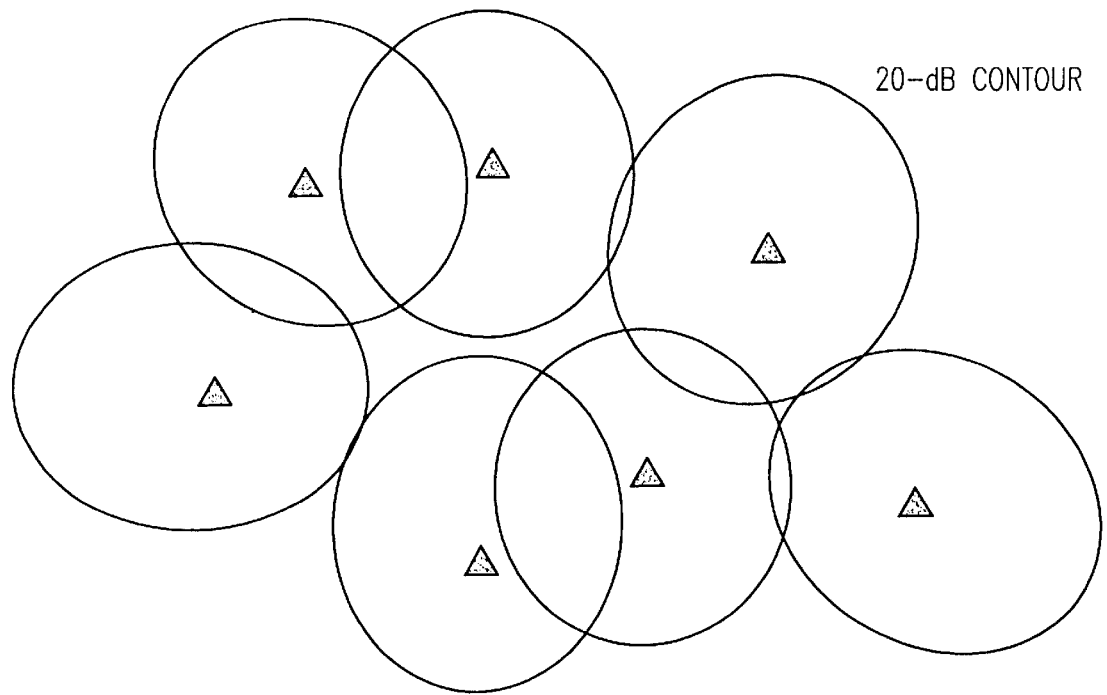
FIG. 10 shows a color 3 code assignment (orange) in accordance with the teachings of the present invention.

FIG. 10 shows a color 3 code assignment (orange) in accordance with the teachings of the present invention.

Figure 11:
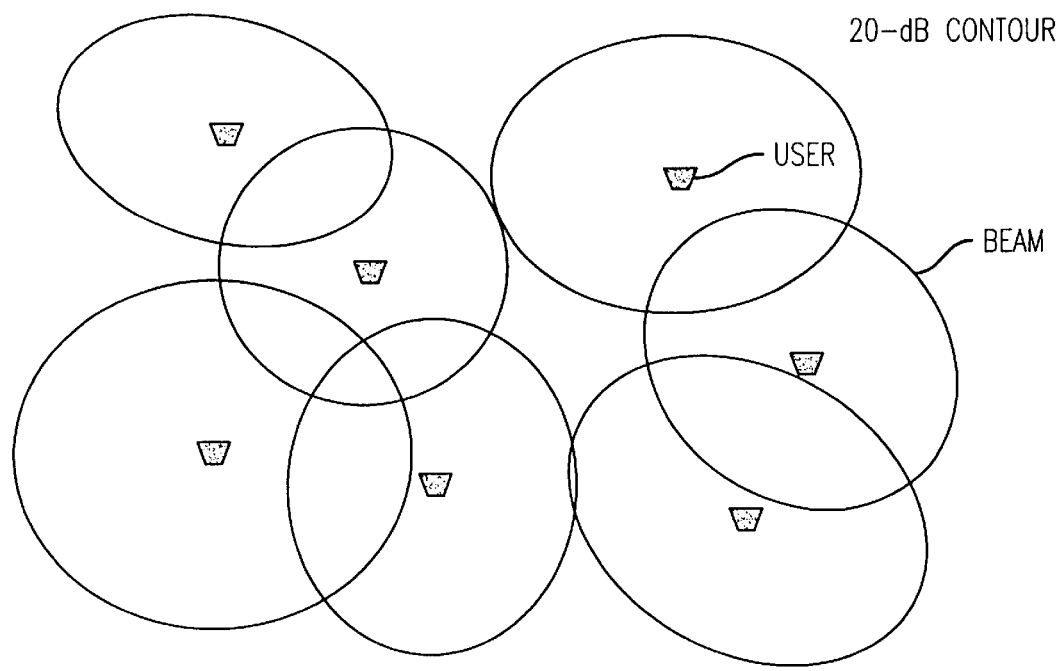
FIG. 11 shows a color 4 code assignment (purple) in accordance with the teachings of the present invention.

FIG. 11 shows a color 4 code assignment (purple) in accordance with the teachings of the present invention.

Figure 12:
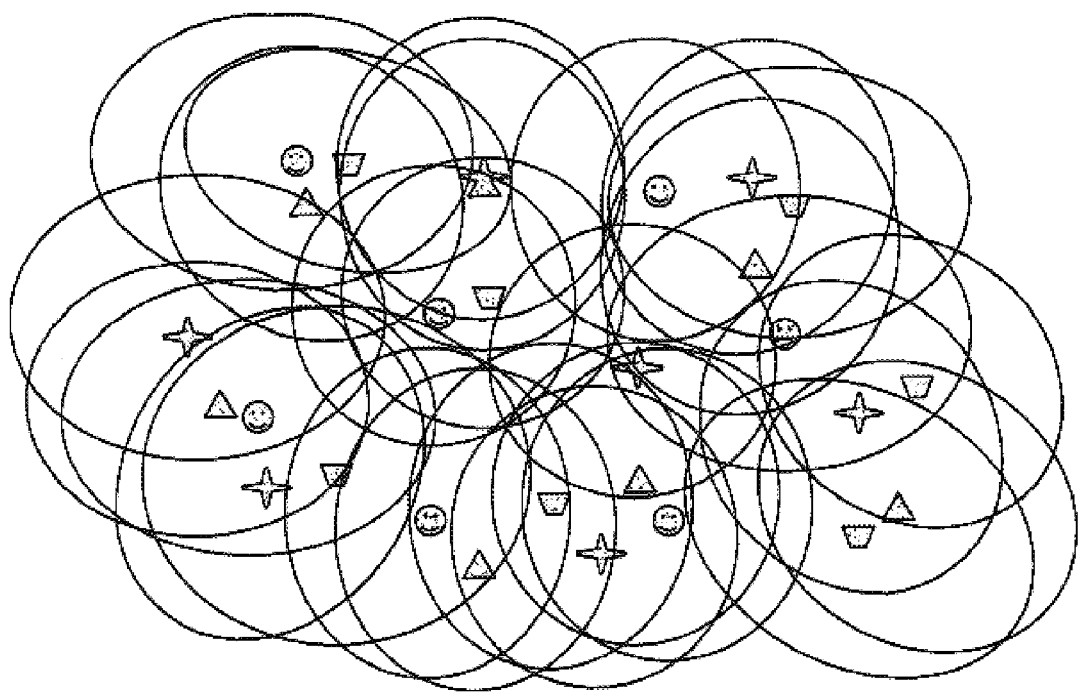
FIG. 12 depicts an overall code assignment.

FIG. 12 depicts an overall code assignment. As shown in FIG. 8, each cell 70 is created by a beam directed to a respective user 50. Note that although the beams overlap, no two beams overlap a user. This is depicted in FIG. 13.

Figure 13:
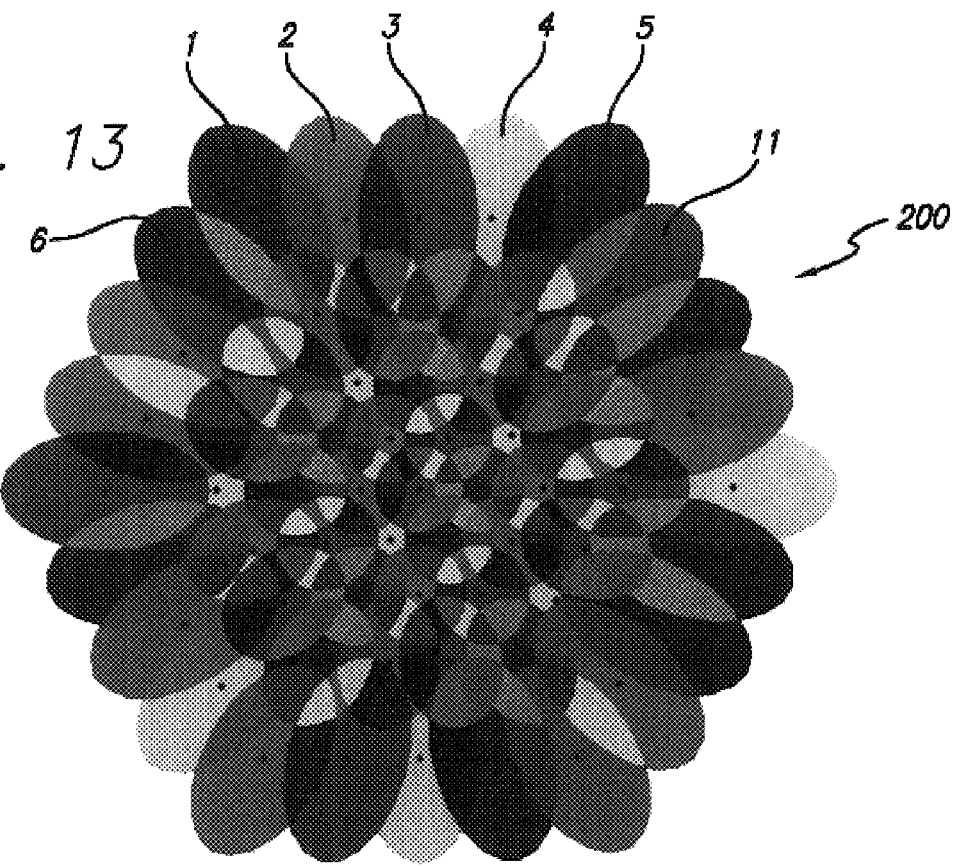
FIG. 13 is a diagram illustrating a distribution of users sharing a code division multiplexed (CDMA) code in accordance with the teachings of the present invention.

FIG. 13 is a diagram illustrating a distribution of users sharing a code division multiplexed (CDMA) code in accordance with the teachings of the present invention. At anytime, a user would not be located inside the contour of another user using the same code. In the FIG. 13, the stars are the users. The oval shaped contours are the isolation forbidden zone. That is, any other user using the same code cannot locate inside the forbiden zone. As in the figure, for each oval contour, there is only one user locate in the center of the contour. FIG. 13 shows the code sharing to one of the CDMA codes. For each different code, a similar figure can be drawn.

Thus, the present invention has been described herein with reference to a particular embodiment for a particular application. The present teachings allow for a very light weight payload with full utilization of the resources that a light-weight payload can offer. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A communication system, comprising:
   a first transceiver located on a first platform at a predetermined altitude;
   a first antenna located on said first platform and connected to said first transceiver;
   a second transceiver located on a second platform physically independent of said first platform;
   a second antenna located on said second platform, said second antenna being adapted to communicate with said first transceiver and being connected to said second transceiver; and
   a beamforming system connected to said second transceiver and mounted on said second platform generating a beamforming signal from said second transceiver to said first transceiver effective to drive said first antenna to radiate a plurality of beams having dissimilar size and shape over a coverage area of a surface, whereby said plurality of beams create dissimilar footprints having a corresponding cell size thereon;
   said beamforming system driving said first antenna to direct a portion of said plurality of beams that are narrower in size to radiate near a center of said coverage area, wherein said cell size varies directly as a function of a distance of a scan angle from nadir, said beamforming system moving at least one of the plurality of beams to follow a movement of a user.

2. The invention of claim 1 wherein said first platform is mobile.

3. The invention of claim 2 wherein said first platform is maintained in a predetermined orbit.

4. The invention of claim 3 wherein said orbit is in a stratosphere.

5. The invention of claim 1, further comprising a third antenna, said third antenna being mounted on said first platform.

6. The invention of claim 5 wherein said third antenna is adapted to receive said beamforming signal from said first antenna.

7. The invention of claim 1, wherein said surface is a surface of earth.

8. The invention of claim 7 wherein said second platform is located on the earth.

9. The invention of claim 1, wherein said beamforming system generates said plurality of beams, each of said plurality of beams having a respective footprint.

10. The invention of claim 9, wherein each said respective footprint is a cell.

11. The invention of claim 10, wherein each of said plurality of beams is directed to a respective user located at a center of each cell.

12. The invention of claim 11, wherein said beamforming system assigns a code to each of said plurality of beams.

13. The invention of claim 12, wherein said beamforming system prevents a user from receiving more than one of said plurality of beams with a given code.

14. The invention of claim 13, wherein said beamforming system anticipates a condition by which a user moves to a position at which the user receives more than one of said plurality of beams with a given code and assigns a second code to at least one of said plurality of beams prior to arrival of the user at said position.

15. A communication system, comprising:
   a first transceiver located on a first platform, said first platform being maintained in a stratospheric orbit;
   a first antenna located on said first platform and connected to said first transceiver;
   a second antenna located on said first platform and connected to said first transceiver;
   a second transceiver located on earth;
   a third antenna being connected to said second transceiver, said third antenna being adapted to communicate with said second antenna; and
   a beamforming system connected to said second transceiver and generating a beamforming signal from said second transceiver to said first transceiver effective to drive said first antenna to radiate a plurality of beams having dissimilar size and shape over a coverage area of a surface on earth, each of said plurality of beams having a respective footprint, at least two of said plurality of beams creating dissimilar footprints thereon, each footprint having a cell, and each of said plurality of beams being directed to a respective user location at a center of each cell, said beamforming system comprising:
a digital beamforming network for scanning at least one of said plurality of beams to follow a movement of a user and to generate an assigned code for each of said plurality of beams, said digital beam forming network preventing the user from receiving more than one beam with a given code;
said beamforming system driving said first antenna to direct a portion of said plurality of beams that are narrower in size to radiate near a center of said coverage area, wherein a size of said cell varies directly as a function of a distance of a scan angle from nadir.

16. The invention of claim 15, wherein said beamforming system anticipates a condition by which the user moves to a position at which the user receives more than one beam with a given code and assigns a second code to at least one of said plurality of beams prior to the arrival of the user at said position.

17. A method for communicating, comprising:
providing a first transceiver on a first platform at a predetermined altitude;
connecting a first antenna to said first transceiver;
providing a second transceiver on a second platform physically independent of said first platform;
connecting a second antenna to said second transceiver, said second antenna being adapted to communicate with said first antenna;
generating a beamforming signal from said second transceiver to said first transceiver effective to drive said first antenna to radiate a plurality of beams having dissimilar size and shape over a coverage area of a surface, whereby said plurality of beams create dissimilar footprints having a corresponding cell size thereon;
driving said first antenna to direct a portion of said plurality of beams that are narrower in size to radiate near a center of said coverage area, wherein said cell size varies directly as a function of a distance of a scan angle from nadir, and
moving at least one of the plurality of beams to follow a movement of a user.

18. A communication system, comprising:
a first transceiver located on a first platform at a predetermined altitude;
a first antenna located on said first platform and connected to said first transceiver;
a second transceiver located at a ground hub, said ground hub being physically independent of said first platform;
a second antenna located on said ground hub, said second antenna being adapted to communicate with said first platform; and
a beamforming system connected to said second transceiver and located at said ground hub generating a beamforming signal from said second transceiver to said first transceiver effective to drive said first antenna to radiate a plurality of individual beams having dissimilar size and shape to a surface, whereby at least two of said plurality of individual beams create dissimilar footprints having a corresponding cell size on said surface in time and space;
said beamforming system driving said first antenna to direct a portion of said plurality of beams that are narrower in size to radiate near a center of said coverage area, wherein said cell size varies directly as a function of a distance of a scan angle from nadir, said beamforming system moving at least one of the plurality of beams to follow a movement of a user.

19. A communication system, comprising:
a first antenna coupled to a first platform at a predetermined altitude;
a second antenna coupled to a second platform that is physically independent of said first platform; and
a beamforming system coupled to said second antenna and generating a beamforming signal to drive said first antenna to radiate a plurality of beams having dissimilar size and shape to a surface, said plurality of beams each having a corresponding cell size;
said beamforming system driving said first antenna to direct a portion of said plurality of beams that are narrower in size to radiate near a center of said coverage area and to increase said cell size of said plurality of beams as a function of a scan angle, said beamforming system moving at least one of the plurality of beams to follow a movement of a user.

20. The system of claim 19, wherein said beamforming system drives said first antenna to alter cell shape with an increase in a scan angle.

21. The system of claim 19, wherein said beamforming system drives said first antenna to elongate cell shape with an increase in a scan angle.

22. The system of claim 19, wherein said plurality of beams create dissimilar footprints on the surface and said footprints have dissimilar cells.

23. The system of claim 19, wherein said plurality of beams have surrounding exclusion regions.

24. The system of claim 23, wherein said surrounding exclusion regions have bounded contours each of which has a magnitude of approximately 20 dB.

25. The system of claim 24, wherein said bounded contours vary in size and shape.

26. The system of claim 19, wherein said beamforming system assigns color codes to respective users, including at least one independent color code.

27. The system of claim 19, wherein said beamforming system determines whether a sidelobe criterion is satisfied when a new user having a selected color code is added.

28. The system of claim 19, wherein said first platform is mobile.

29. The system of claim 19, wherein said first platform is maintained in a predetermined orbit.

30. The system of claim 29, wherein said orbit is in a stratosphere.

31. The system of claim 19, further comprising:
a third antenna, said third antenna being mounted on said first platform.

32. The system of claim 31, wherein said third antenna is adapted to receive said beamforming signal from said second antenna.

33. The system of claim 19, wherein said surface is a surface of earth.

34. The system of claim 19, wherein said second platform is earth based.

35. The system of claim 19, wherein each one of said plurality of beams creates a footprint on the surface and each footprint is a cell.

36. The system of claim 35, wherein each of said beams in said plurality of beams is directed to a respective user located at a center of each cell.

37. The system of claim 36, wherein said beamforming system assigns a code to each of said beams in said plurality of beams.

38. The system of claim 37, wherein said beamforming system prevents a user from receiving more than one beam with a particular code.

39. The system of claim 38, wherein said beamforming system alters the code of at least one beam of said plurality of beams to prevent a user from receiving more than one beam with a particular code.

40. A method of operating a communications system having a plurality of mobile users and a stratospheric platform, comprising:

generating a plurality of beams from the stratospheric platform, each of said plurality of beams associated with a respective one of the plurality of users;

moving the plurality of beams with the plurality of users; and increasing a size of the plurality of beams as a distance of a center of the plurality of beams from a nadir of the stratospheric platform increases.

41. The method of claim 40, wherein generating comprises generating a plurality of beams so that a respective one of the plurality of users is at a center of a respective one of the plurality of beams.

42. The method of claim 41, wherein generating comprises generating a plurality of non-interfering beams.

43. The method of claim 42, wherein a plurality of codes are assigned to the non-interfering beams.

44. The method of claim 43, further comprising:
reusing the plurality of codes.

45. The method of claim 41, further comprising:
generating a broad beam; and
identifying new users with the broad beam.

46. The method of claim 41, further comprising:
upon detecting a potential interference in said plurality of beams, reassigning a beam code in response to detecting.

47. The method of claim 40, wherein prior to generating, receiving a beamforming signal from a ground hub.

48. A method for communicating with a plurality of users, comprising:

receiving a beamforming signal;

generating a plurality of beams from a stratospheric platform in response to the beamforming signal, said plurality of beams having dissimilar size and shape and a corresponding cell size over a coverage area, whereby said beams create dissimilar footprints thereon so that beams that are narrower in size radiate near a center of said coverage area, wherein said cell size varies directly as a function of a distance of a scan angle from nadir; and moving the plurality of beams with the plurality of users.

49. The method of claim 48, further comprising:
detecting a new user with a broad beam.

50. The method of claim 48, wherein receiving comprises receiving a beamforming signal from a ground hub.

51. A communication system, comprising:

a stratospheric platform generating a plurality of individual beams having dissimilar sizes and shapes and a corresponding cell size, whereby at least two of said plurality of individual beams create dissimilar footprints on said surface in time and space so that beams that are smaller in cell size radiate near a center of said coverage area and so that the plurality of individual beams move to follow a movement of a corresponding user.

52. The communication system of claim 51, wherein said stratospheric platform generates a broad beam where no individual beams are present to detect new users.

53. The communication system of claim 51, further comprising:

a ground hub transmitting a beamforming signal to said stratospheric platform, said plurality of individual beams being generated as a function of the beam forming signal.

54. A method of operating a communication system, comprising:

generating a first beam for a first user having a first beam size at or near a nadir of the stratospheric platform;

locating the user at a center of the beam having a corresponding cell size to define a beam scan angle;

repositioning the beam as the user moves to maintain the user in the center of the beam; and increasing the cell size at the platform as a function of the scan angle.

55. The method of claim 54, further comprising:
generating a second beam having a dissimilar size and shape for a second user.

56. The method of claim 55, wherein the second user is positioned outside the first beam, said first beam and said second beam having a first code.

57. The method of claim 56, further comprising:
changing the second user to a second code when a potential interference between said first beam and said second beam is detected.

58. The method of claim 54, wherein increasing the cell size comprises elongating the beam in a first direction.

\* \* \* \* \*